United States Patent [19]
Lawless

[11] Patent Number: 5,972,182
[45] Date of Patent: Oct. 26, 1999

[54] ELECTRODE COMPOSITION AND APPLICATION METHOD FOR OXYGEN GENERATORS

[75] Inventor: William N. Lawless, Westerville, Ohio

[73] Assignee: CeramPhysics, Inc., Westerville, Ohio

[21] Appl. No.: 08/986,161

[22] Filed: Dec. 5, 1997

[51] Int. Cl.[6] ............................... C25B 9/00; C25B 11/00
[52] U.S. Cl. ..................... 204/258; 204/270; 204/290 R; 204/291; 204/293
[58] Field of Search .................................... 204/258, 291, 204/290 R, 293, 242, 270

[56] References Cited

U.S. PATENT DOCUMENTS

| | | |
|---|---|---|
| 4,296,608 | 10/1981 | Lawless . |
| 5,022,975 | 6/1991 | Gordon .................................. 204/277 |
| 5,034,023 | 7/1991 | Thompson . |
| 5,205,990 | 4/1993 | Lawless . |
| 5,332,483 | 7/1994 | Gordon .................................. 204/265 |
| 5,378,345 | 1/1995 | Taylor ................................. 204/242 X |
| 5,456,807 | 10/1995 | Wachsman .......................... 204/252 X |
| 5,770,326 | 6/1998 | Limaye ............................... 204/258 X |

OTHER PUBLICATIONS

Physicochemical and electrochemical properties of solid solutions La1–xPbxMnO3(x=0.1–0.6), Authors: Yu S. Gaiduk, V.V. Kharton, E.N. Naumovich, A.V. Nichkolaev and V.V. Samokhval, from STN Easy: Search Results: Chemistry References, 1997 ACS, 1 page, (No Month).

*Primary Examiner*—Donald R. Valentine
*Attorney, Agent, or Firm*—Renner, Otto, Boisselle & Sklar, P.L.L.

[57] ABSTRACT

The present invention is an oxygen generator including a stabilized bismuth oxide body and a plurality of first and second channels. The first channels receive a first gas containing some oxygen and the second channels are sealed at the input and outlet openings and extend generally in parallel to the first channels. Electrodes are disposed on the channel walls of the first and second channels, the electrode composition includes LXM, wherein L is lanthanum, M is manganate, and X is strontium, calcium, lead or barium. The oxygen generator may further include silver disposed over the LXM which thereby decreases the resistivity of the electrodes without the electromigration of the silver. The silver may be mixed with glass to thereby provide improved adherence of the silver to the LXM. A method of making an oxygen generator includes forming a stabilized bismuth oxide body having channels extending therethrough and forming LXM electrodes in the channels. Forming the LXM electrodes in the channels includes mixing an LXM powder with an organic liquid to form a slurry, applying the slurry to the stabilized bismuth oxide body and firing the body. The method may further include forming a silver layer over the LXM in the channels, thereby forming a multi-layer electrode composition having a low resistivity in which the LXM acts as an electromigration barrier for the silver.

12 Claims, 11 Drawing Sheets

ELECTRODE COMPOSITION AND APPLICATION METHOD FOR OXYGEN GENERATORS

FIELD OF THE INVENTION

The present invention relates to an oxygen generator, and more particularly, to an electrode composition and application method for forming electrodes within oxygen generators.

BACKGROUND OF THE INVENTION

Oxygen tends to move from a gas containing a high concentration of oxygen to one of lower concentration. If the two gases are separated from each other by an oxygen ion conductor, oxygen molecules will dissociate by catalysis on one surface of the conductor and absorb electrons to form oxygen ions. These oxygen ions can then diffuse through the ionic conductor, leaving the entry surface with a deficiency of electrons. Emerging on the exit or low oxygen concentration side of the ion conductor, oxygen ions give up electrons via catalysis to form molecular oxygen, leaving the exit surface with an excess of electrons. Thus, an electrical potential difference, or EMF, is set up between the two surfaces of the ionic conductor. The greater the difference in oxygen content of the two gases, the greater will be the tendency of oxygen to diffuse through the conductor, and the greater will be the potential difference between the entry and exit surfaces.

These basic principles underlie the operation of oxygen sensing devices, which are generally well known in the art. Oxygen sensors function by monitoring the EMF developed across an oxygen ion conductor which is exposed to gases having different oxygen partial pressures. The reciprocal principle underlies the operation of oxygen separators (also called oxygen generators) such as disclosed in U.S. Pat. No. 4,296,608. Voltage is applied across an oxygen ion conducting material and oxygen ions will be forced to flow across the material such that the oxygen partial pressures become equal. Thus, one gas will become richer in oxygen than the other, resulting in a basic oxygen generator. A physical structure for an oxygen generator composed of an oxygen ion conducting material is disclosed in U.S. Pat. No. 5,205,990 and is highlighted in prior art FIGS. 1–3 in the present application and the entire disclosure is hereby incorporated by reference.

Generally, a prior art oxygen generator 10 includes a ceramic honeycomb body 12 made of an oxygen ion conducting material having a first plurality of channels 14 and a second plurality of channels 16 extending therethrough from a front face 18 to a back face 20. The channels 14 and 16 are arranged in alternating rows, resembling a striped pattern laterally across faces 18 and 20 of the ceramic honeycomb body 12. The oxygen generator 10 further includes a voltage source 22 electrically connected to the channels 14 and 16 through electrode connectors 24 and 26 which are located on a top portion 28 of the ceramic honeycomb body 12, respectively. Each of the channels have electrodes disposed over their respective side walls along their entire length. The connection methodology is such that each of the first channels 14 are electrically connected in parallel and each of the second channels 16 are also electrically connected in parallel. The voltage source 22 is operable to apply a voltage across the electrodes within the channels 14 and 16, thereby creating a voltage potential across the first and second channels 14 and 16 and enabling oxygen ion conduction through the ceramic honeycomb body 12 from one channel to another.

The oxygen generator 10 receives a source gas 30 containing some oxygen, for example, air, into the first channels 14 which are open on both the front face 18 and back face 20 of the body 12. The oxygen ions pass through the oxygen ion conducting material of the body 12 from the first channels 14 to the second channels 16 which are sealed on both the front face 18 and back face 20 of the body 12. In this manner the source gas 30 contains more oxygen than an exit gas 32 from the back face 20 due to the conduction of oxygen ions into the second channels 16. The oxygen 34 within the second channels 16 is collected from a side face 36 of the body 12 via a plurality of third channels 38 which laterally intersect the second channels 16 approximately in the middle of the side face 36.

Prior art FIG. 2 is a perspective view illustrating in greater detail a prior art electrode composition wherein electrodes 40 and 42 are disposed on the surfaces (side walls) of the channels 14 and 16. The prior art electrode composition, for example, is a platinum, catalytic material. Prior art FIG. 3 is another perspective view illustrating another prior art electrode composition having platinum as the electrodes 40 in the first channels 14 and a copper, nickel wool or mesh 44 in the second channels to further reduce electrode resistance. Neither prior art electrode composition, however, is satisfactory. For example, platinum is an expensive raw material, making the cost of forming electrodes within the channels 14 and 16 approximately $300 for the generator 10 of prior art FIG. 1. Further, as stated in U.S. Pat. No. 5,205,990, the copper, nickel wool or mesh 44 of prior art FIG. 3 is quite expensive. Since oxygen generators are desired for individual, ambulatory medical care applications, such prior art electrode compositions make such product applications cost prohibitive.

In addition, the prior art electrode compositions exhibit a substantial resistivity, which causes undesirable excess power dissipation. Since oxygen generators are desirable for ambulatory care applications, it is often necessary to use oxygen generators in conjunction with batteries. Therefore the excess power dissipation associated with the high prior art electrode resistivity is undesirable. Further still, the appreciable electrode resistivity requires that the channels 14 and 16 be rather short in length to avoid current crowding along the lengths of the channels 14 and 16. Having short channels negatively impacts the oxygen generating capacity of the generator and/or places constraints on the oxygen generator's form factor for a given oxygen generating capacity. Lastly, a large number of short channel lengths make the extrusion of the body 12 more expensive and less reliable and is consequently undesirable.

SUMMARY OF THE INVENTION

According to one aspect of the invention, an oxygen generator includes a stabilized bismuth oxide body and a plurality of first and second channels defined by channel walls which extend from inlet openings to outlet openings in the body. The first channels receive a first gas containing some oxygen and the second channels are sealed at the input and outlet openings and extend generally in parallel to the first channels. In addition, electrodes are disposed on the channel walls of the first and second channels and the electrodes include LXM, wherein L is lanthanum, M is manganate, and X is one of either strontium, calcium, lead or barium. The oxygen generator may further include silver disposed over the LXM which thereby decreases the resistivity of the electrodes. In addition, surprisingly, it was discovered that the LXM prevented the electromigration of the silver into the stabilized bismuth oxide body.

Furthermore, the silver may be mixed with glass to thereby provide improved adherence of the silver to the LXM.

According to another aspect of the invention, an electrode composition in an oxygen generator includes a stabilized bismuth oxide body having channels extending therethrough and electrodes in the channels. The electrode composition includes lanthanum (L), manganate and either strontium, calcium, lead or barium (X). The LXM electrode composition may be characterized by the relation $L_{(1-Y)}X_Y$, wherein $0.1<Y<0.5$. Additionally, silver may be disposed over the electrodes to thereby reduce the resistivity of the electrodes.

In yet another aspect of the present invention, a method of making an oxygen generator includes forming a stabilized bismuth oxide body having channels extending therethrough and forming LXM electrodes in the channels. A first and second group of channels are interconnected and a voltage source is connected across the first and second group of channels. The step of forming the LXM electrodes in the channels includes the steps of mixing an LXM powder with an organic liquid to form a slurry, applying the slurry to the stabilized bismuth oxide body and firing the body. The method may further include forming a silver layer over the LXM in the channels, thereby forming a multi-layer electrode composition having a low resistivity. In this composition, the LXM acts as an electromigration barrier for the silver.

DETAILED DESCRIPTION OF THE INVENTION

Figure 1:
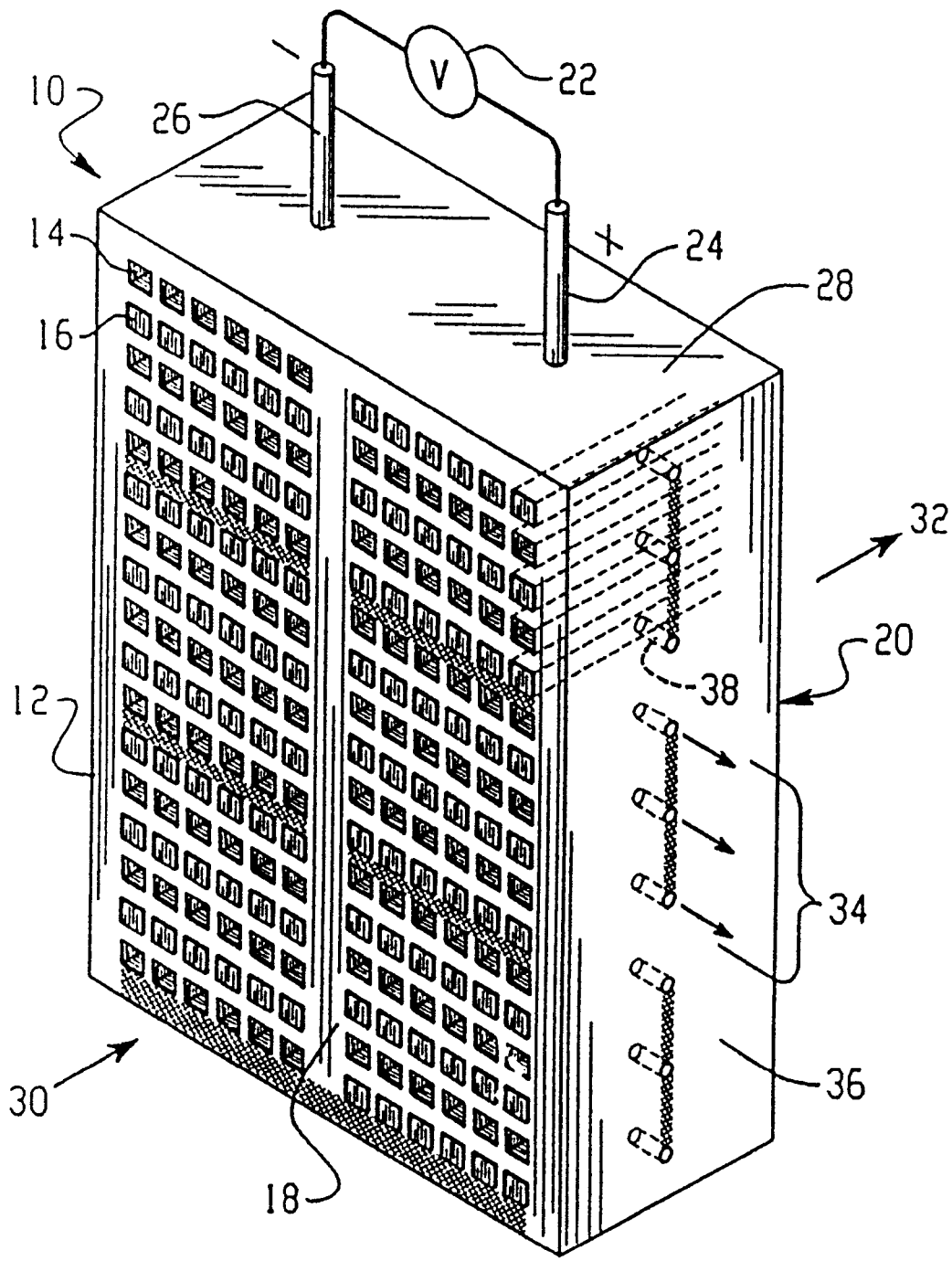
FIG. 1 is a perspective view of a prior art oxygen generating apparatus.

The present invention will now be described with reference to the drawings wherein like reference numerals are used to refer to like elements throughout. The invention includes an oxygen generating apparatus having a unique electrode composition which allows the oxygen generators to be manufactured substantially less expensively. Further, an electrode composition provides substantial improvements in conductivity (therefore decreased resistivity) over the prior art, thereby substantially decreasing undesirable power dissipation and allowing for increased flexibility in the generator form factor for a given oxygen generating capacity.

Figure 4:
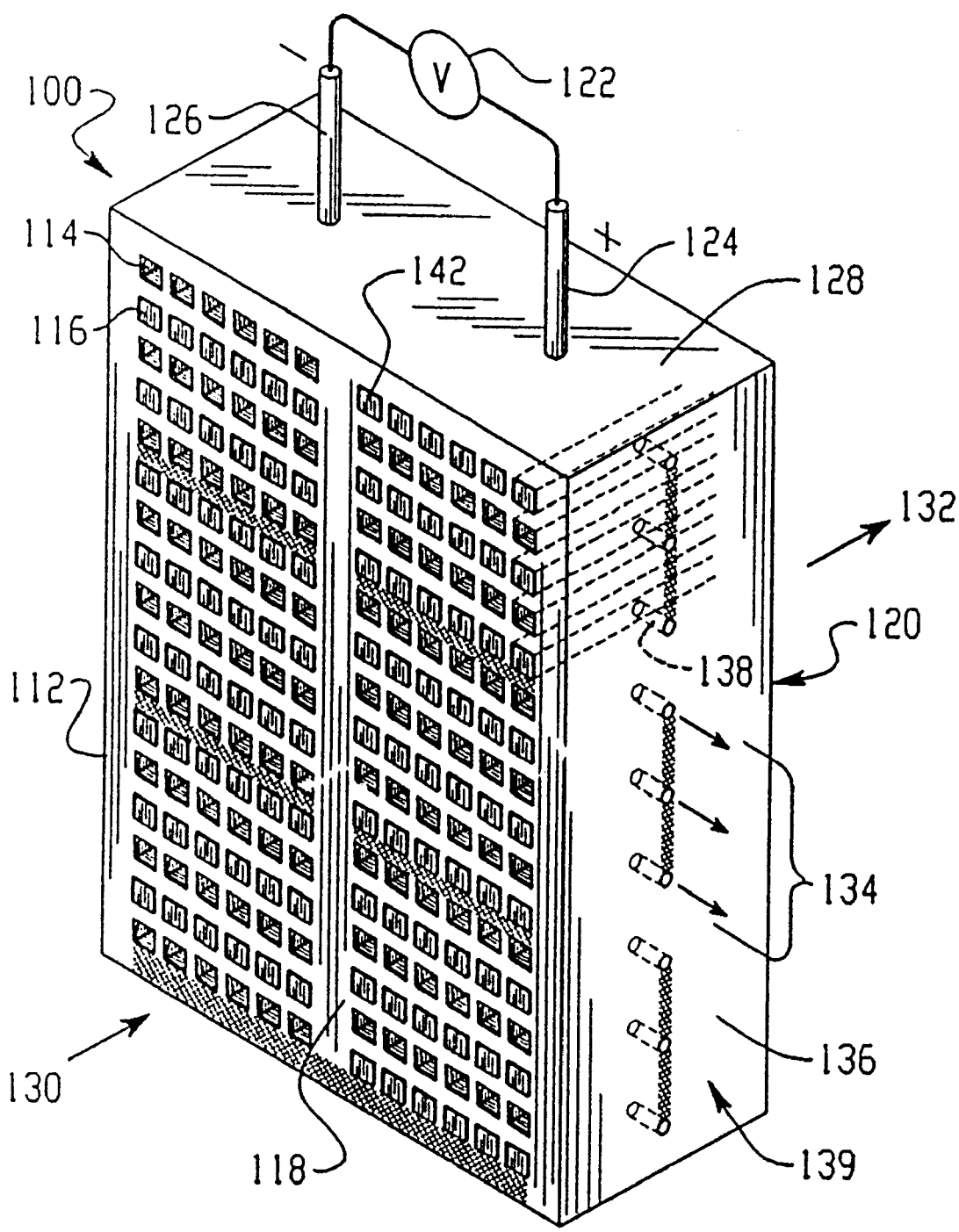
FIG. 4 is a perspective view of an oxygen generating apparatus according to the present invention.

Turning now to FIG. 4, a perspective view of an oxygen generator 100 according to one embodiment of the present invention is illustrated. The oxygen generator 100 includes a ceramic honeycomb body 112 made of stabilized bismuth oxide, an oxygen ion conducting material, having a first plurality of channels 114 and a second plurality of channels 116 extending therethrough from a front face 118 to a back face 120. The channels 114 and 116, according to one embodiment of the present invention, are arranged in alternating rows, resembling a striped pattern laterally across the faces 118 and 120 of the ceramic honeycomb body 112. The oxygen generator 100 further includes a voltage source 122 electrically connected to the channels 114 and 116 through electrode connectors 124 and 126 which are located on a top portion 128 of the ceramic honeycomb body 112, respectively. Each of the channels 114 and 116 have electrodes formed therein on their respective side walls. An electrode connection methodology allows each of the first channels 114 to be electrically connected in parallel via their electrodes and each of the second channels 116 to also be electrically connected in parallel via their electrodes. The voltage source 122 is operable to apply a voltage across the electrodes thereby creating a voltage potential across the plurality of first and second channels 114 and 116 and enabling oxygen ion conduction through the ceramic honeycomb body 112 from one channel to another.

The electrodes are formed within each of the first and second channels 114 and 116 and preferably comprise thin coatings of a conductive material along the side walls of each channel. Due to the thin nature of the electrode coatings, the electrodes within FIG. 4 are not visible as discrete coatings. Various connection methodologies may be utilized to interconnect the electrodes within the respective first and second channels 114 and 116. One manner of interconnecting the electrodes is to attach wires that laterally cross the first channels 114 and second channels 116, respectively at the front or back faces 118 and 120 to thereby make electrical contact to the electrodes within the channels. Consequently, all the first channels 114 are connected in parallel and all the second channels 116 are connected in parallel while maintaining the first and second channels 114 and 116 electrically isolated from one another. Another method of interconnecting the electrodes would be to cover the front and back faces 118 and 120 of the body 112 with a conductive film or coating in conjunction with a mask such that on the front face 118, for example, the first channels 114 would be interconnected via the conductive film contacting the electrodes within the first channels 114 while isolating the second channels 116 from the first channels 114 via the mask. Similarly, on the back face 120 the second channels 116 would be interconnected while isolating the first channels 114 with a mask. In yet another embodiment, a combination of the above methods may be utilized. Any structurally or functionally equivalent means for interconnecting the electrodes is contemplated to fall within the scope of the present invention.

The oxygen generator 100 receives a source gas 130 containing some oxygen (e.g., air) into the first channels 114 which are open on both the front face 118 and the back face 120 of the body 112. The oxygen ions pass through the oxygen ion conducting material of the body 112 from the first channels 114 to the second channels 116 (which are sealed on both the front face 118 and back face 120 of the body 112) when a voltage is applied (via the voltage source 122) across the electrodes within the channels 114 and 116. Consequently, the source gas 130 contains more oxygen than an exit gas 132 due to the conduction of oxygen ions into the second channels 116. The oxygen 134 within the second channels 116 is collected from a side face 136 of the body 112 via a plurality of third channels 138 which laterally intersect the second channels 116. Oxygen within each of the second channels 116 is channeled through the third channels 138 to the side face 136 (the third channels 138 may alternatively be called oxygen collection channels).

The second channels 116 are sealed at the front and back faces 118 and 120 with plugs 142 which prevent generated oxygen 134 from leaking out of the second channels of the generator 100 at either of the faces 118 and 120 and help direct the oxygen 134 along the third channels 138. Preferably, the plugs 142 are beaded glass formed from a slurry.

Alternatively, however, any electrically insulating material may be used (e.g., a ceramic plug), although materials having a coefficient of expansion substantially similar to that of the body 112 work most reliably and are therefore preferred.

According to the oxygen generator structure 100 of FIG. 4, the oxygen 134 which is generated in the second channels 116 due to oxygen ion conduction through the body 112 from the first channels 114 flows within the second channels 116 and into the third channels 138 for collection at the side face 136. The oxygen is then collected from the third channels 138 via a plurality of holes 139 which operate as oxygen output ports. In this particular embodiment, the holes 139 are illustrated on the side face 136 at approximately the midpoint between the front and back faces 118 and 120. Alternatively, the holes 139 may be located at any location along the side face 136 of the body 112.

Figure 5:
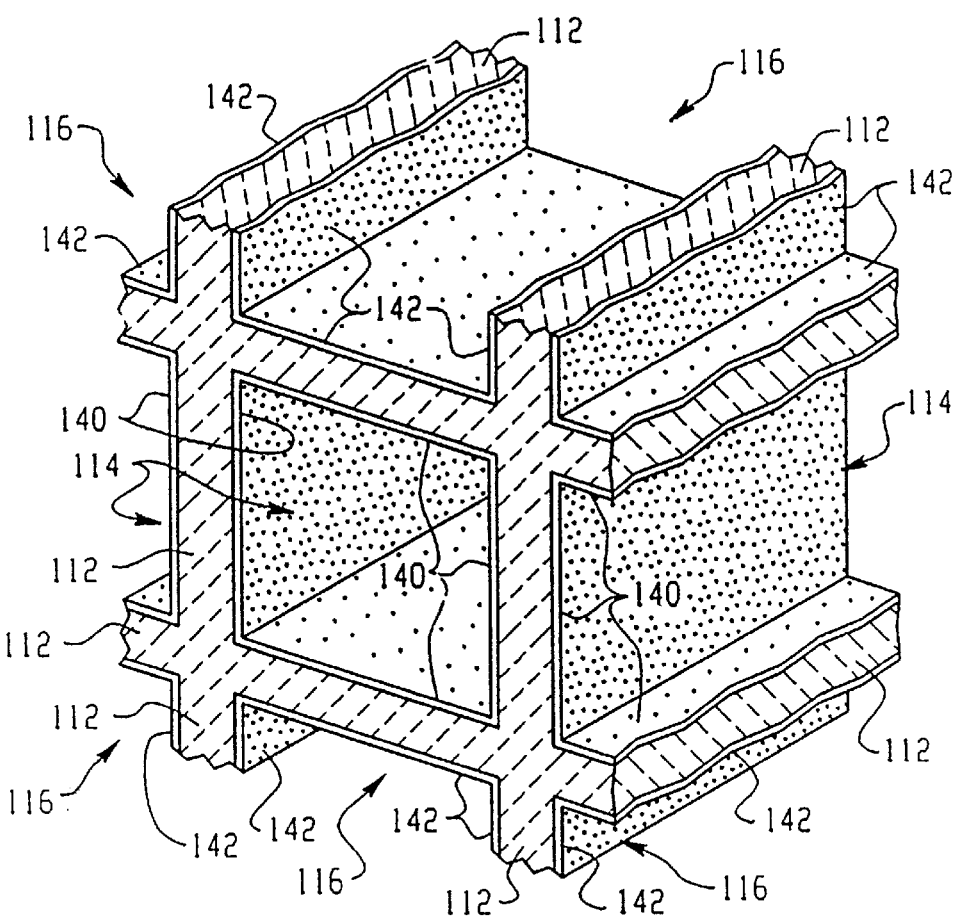
FIG. 5 is a perspective view of channels containing electrodes according to one embodiment of the present invention.

The oxygen generator 100 of FIG. 4 appears similar in several respects to the oxygen generator 10 of prior art FIG. 1, however, it differs in one primary aspect in that the oxygen generator 100 employs a novel electrode composition. A portion of the oxygen generator 100 having the new electrode composition is illustrated in greater detail in FIG. 5. FIG. 5 illustrates a plurality of adjacent first and second channels 114 and 116, respectively. The body 112 has a first electrode 140 that covers the side walls of the first channels 114 and a second electrode 142 that covers the side walls of the second channels 116. Both the electrodes 140 and 142 are composed of an electrically conducting and an oxygen ion conducting electrode material, namely LXM.

LXM is an electrically conducting and an oxygen ion conducting ceramic material, wherein L is lanthanum (La), X is either strontium (Sr), calcium (Ca), lead (Pb) or barium (Ba), and M is $MnO_3$ (manganate). Although LXM has previously been proposed as a potential ceramic conductor, previous attempts to utilize such a composition as an electrode occurred with zirconia. In the present invention the LXM composition is used as an electrode in conjunction with a stabilized bismuth oxide body (such as the body 112). The following experiment was conducted.

A fine grained LXM powder (wherein X was strontium) was mixed with an organic liquid (terpineol) to form a slurry. The slurry was then painted on a stabilized bismuth oxide honeycomb wall in a somewhat thin coating (no coating thickness measurements were taken, however, the slurry had the consistency of a dilute enamel paint). The slurry was then fired at about 95° C. for about 30 minutes, thereby sintering the LXM coating on the stabilized bismuth oxide wall. After firing, the LXM coating and stabilized bismuth oxide wall were analyzed and no chemical reaction between the LXM and stabilized bismuth oxide was detected. In addition, no diffusive penetration of the LXM into the stabilized bismuth oxide wall was detected. Further still, other conductive ceramic compounds (other than LXM) were also tried with the stabilized bismuth oxide wall as the body material and those compositions reacted negatively with the stabilized bismuth oxide. Once LXM (with X being strontium) was found to work well as an electrode material with the stabilized bismuth oxide body, other permutations were tried and it was found that X could be either strontium (Sr), calcium (Ca), lead (Pb) or barium (Ba); however, lead is the preferred element. In addition, it was found that the amounts of the elements could fall within the following range: $La_{(1-y)}X_yMnO_3$, wherein $0.1 < Y < 0.5$. In addition, it was determined that the following composition was most preferred: $La_{0.8}Pb_{0.4}MnO_x$ (hereinafter "LPM(40)"). LPM (40) is the preferred electrode material because it results in improved sintering conditions when applied to the stabilized bismuth oxide body walls. In addition, the LPM(40) results in a desirable perovskite structure. Lastly, as will be discussed in greater detail supra, the LPM(40) interacts well with a silver overlay to provide decreased electrode resistance without silver electromigration. Further, the combination of LPM(40) and silver does not exhibit substantial pitting and further exhibits substantially no loose surface powder associated with it (which allows for good adherence between the silver and LPM(40) films).

It was also determined after further experimentation that the grain size of the LXM material was important when forming the slurry. It was found that as the particle size of the LXM powder was decreased, the adherence of the LXM to the stabilized bismuth oxide wall was substantially improved. It was also determined that as the particle size of the LXM was decreased, the slurry can be effectively fired at lower temperatures which is highly advantageous since firing at lower temperatures is less expensive, faster and prevents grain growth in the stabilized bismuth oxide body 112. It was found that as the particle size of the LXM was decreased below 5 microns (and even more preferably less than 1 micron) both the adherence of the LXM to the stabilized bismuth oxide was improved and the effective firing temperature was decreased. For example, as opposed to firing the slurry at 950° C., it was found that the slurry could be effectively fired as low as 900° C.

When creating the slurry, terpineol was used, however, any organic liquid would also adequately serve such a purpose. For example, isopropyl alcohol, glycerine or even water could be used. Terpineol, however, is preferred because due to its low vapor pressure it does not evaporate quickly, thereby making it easy to control. In addition, terpineol burns away cleanly at firing which was also found to be advantageous.

The LXM electrode composition is more desirable than prior art electrode compositions such as platinum in that LXM is substantially less expensive. For example, the cost of forming platinum electrodes in a honeycomb body such as the body 112 in FIG. 4, is approximately $300. Conversely, the cost of forming LXM electrodes in the body 112 of FIG. 4 is only approximately $1.00. This substantial decrease in cost (approximately 300× cost reduction) allows the oxygen generator 100 to be substantially less expensive.

Consequently, an oxygen generator employing the electrodes of the present invention is available to a larger market of customers. Since the oxygen generator 100 may be utilized in the medical field as a portable oxygen generating apparatus, the above LXM electrode breakthrough allows more patients to purchase this technology, thereby improving the quality of people's lives.

A method and apparatus by which the LXM electrode composition may be applied to the honeycomb body 112 will now be described in conjunction with FIG. 6. The apparatus 200 includes a funnel-shaped reservoir 202 attached to a pump 204 which recirculates an LXM slurry 206 in the reservoir 202 through a recirculation path 208. The reservoir 202 is preferably funnel-shaped to prevent settling of the slurry, however, any type of reservoir may be utilized. In addition, when the body 112 is in the reservoir 202, the body preferably seals against the reservoir sidewalls so that the slurry 206 must flow through the channels 114 and 116 of the body 112.

The LXM slurry 206 is formed with a fine grained LXM powder having a particle size of preferably less than 5 microns and most preferably less than 1 micron. The LXM powder is mixed with an organic liquid, preferably terpineol, in amounts sufficient to provide a slurry having a viscosity low enough to be drawn through the channels 114 and 116 of the stabilized bismuth oxide honeycomb body 112. It was found that a suitable mixture range of terpineol and LXM (wherein LXM is LPM(40)) is about 0.510 ml of terpineol per gram of LXM to about 1.145 ml of terpineol per gram of LXM. Furthermore, the most preferred mixture is about 1.145 ml of terpineol per gram of LXM since this mixture provides a substantial dilution (and therefore minimizes the electrode cost) while still providing good electrical and mechanical properties. Surprisingly, it was found that an increase of the dilution of the LXM with terpineol having a diluted silver overlay (as will be discussed supra) provides a lower electrode resistivity than similar undiluted films.

The honeycomb body 112 is then placed in the reservoir 202 with the slurry 206 preferably surrounding the entire body 112. The body 112 is preferably oriented in the reservoir 202 with its front and back faces 118 and 120 transverse to the fluid flow so that the slurry will travel through the channels 114 and 116 when the pump 204 is operational.

The pump 204 is then activated which begins recirculating the slurry 206 through the recirculation path 208 which consequently pulls the slurry 206 through the channels 114 and 116 within the body 112. Consequently, the apparatus 200 operates as a forced flow apparatus by forcing the slurry 206 through the stabilized bismuth oxide honeycomb body 112 and thereby depositing the LXM slurry 206 on the sidewalls of the channels 114 and 116. The pump 204 also advantageously recirculates the slurry to prevent the components of the slurry from settling out. Subsequently, the body 112 is fired at approximately 900° C. for approximately 30 minutes to sinter the LXM electrode composition within the channels 114 and 116.

The method and apparatus 200 described above with respect to FIG. 6 is only one method and apparatus by which an LXM electrode composition may be formed in the channels 114 and 116 of the honeycomb body 112. For example, a reservoir containing the LXM slurry may be used and the honeycomb body 112 then dipped into the slurry. Further, any method by which the LXM electrodes may be formed within the channels 114 and 116 of the honeycomb body 112 is contemplated by the present invention.

Figure 2:
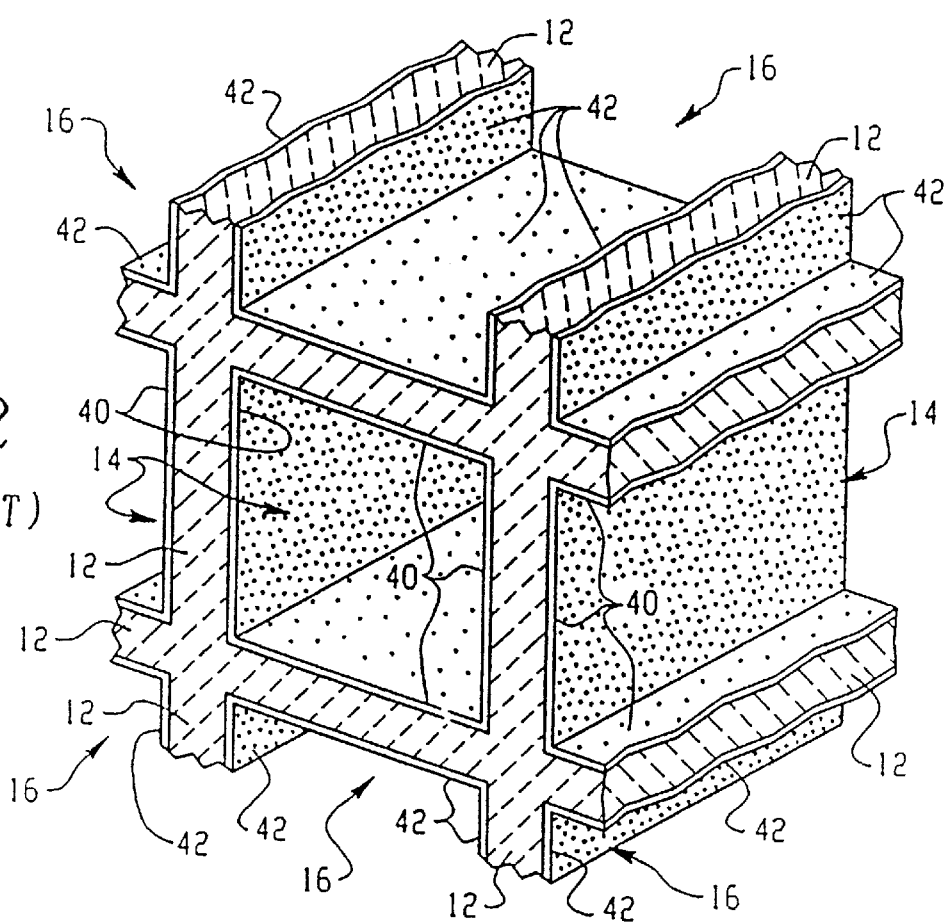
FIG. 2 is a perspective view of channels containing electrodes in a prior art oxygen generating apparatus.
Figure 3:
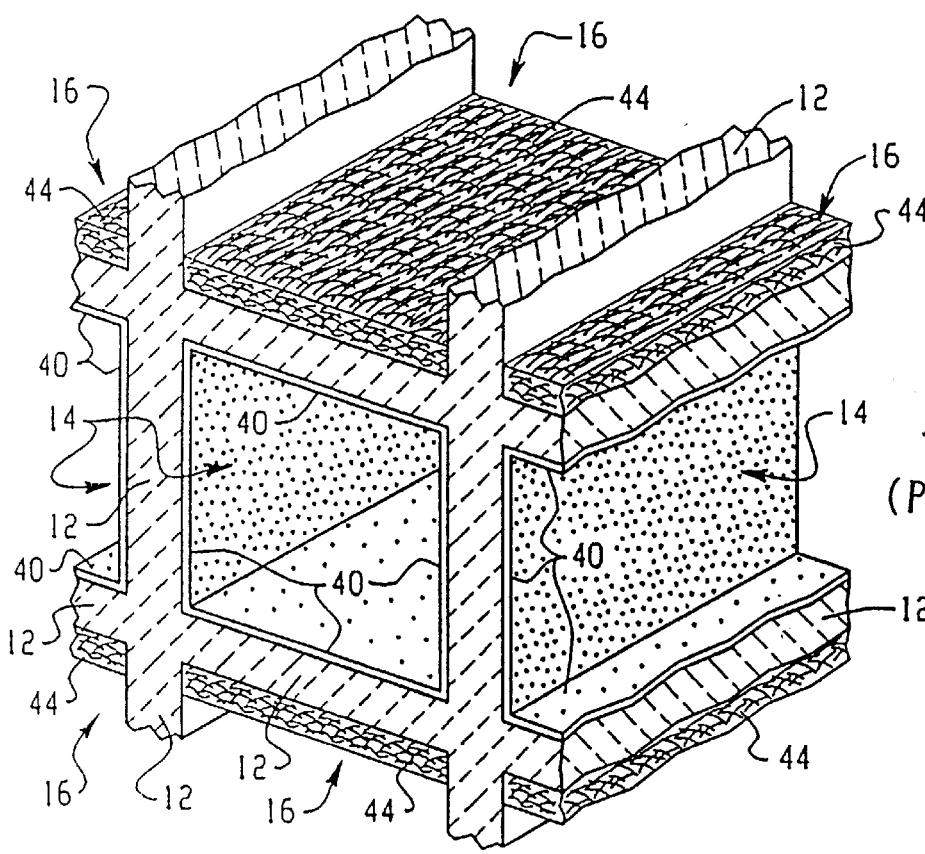
FIG. 3 is another perspective view of channels containing electrodes in another prior art oxygen generating apparatus.
Figure 7:
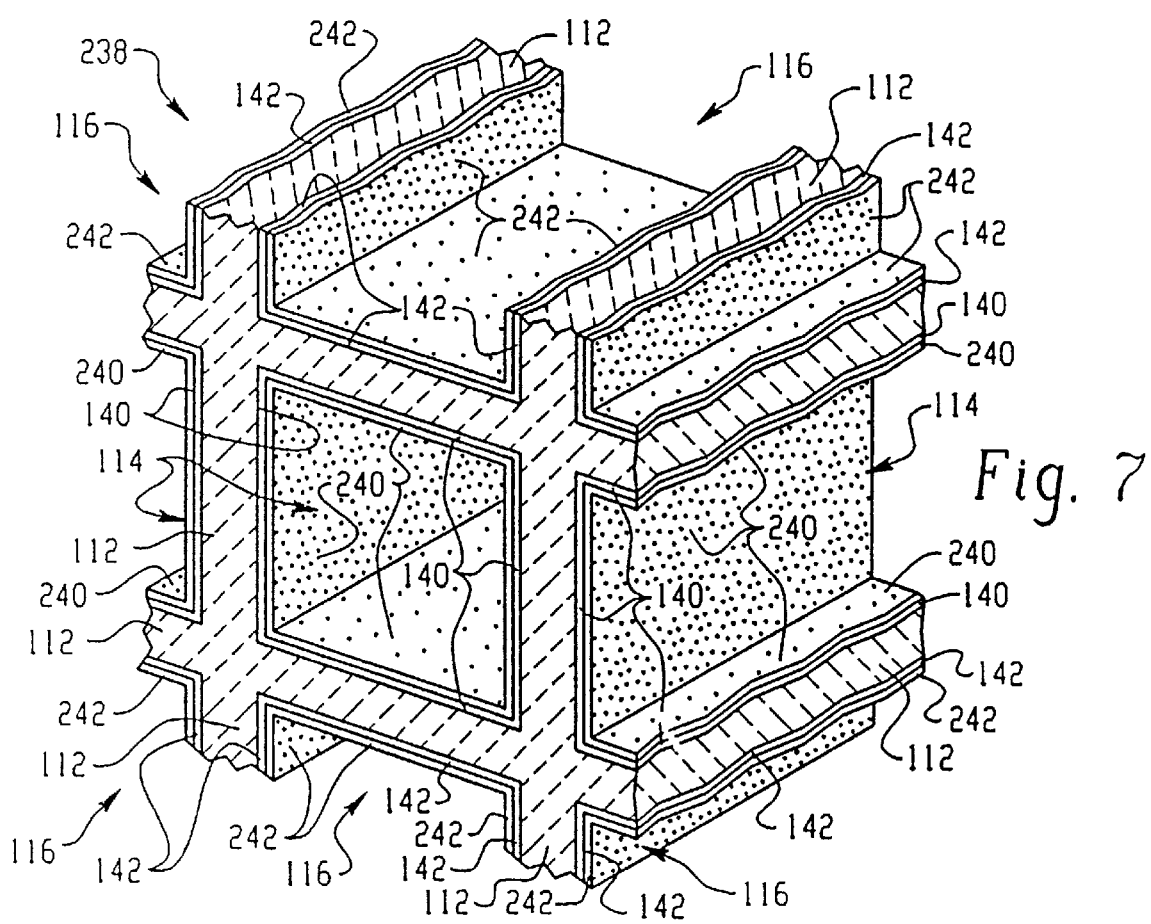
FIG. 7 is a perspective view of channels containing electrodes according to another embodiment of the present invention.

According to another embodiment of the invention, another new electrode composition is described in conjunction with FIG. 7. In FIG. 7, a plurality of channels 114 and 116 have sidewalls that are covered with a two layer electrode composition 238 of LXM and silver (Ag). In the first channels 114, the LXM layer 140 overlies the stabilized bismuth oxide body 112 and a silver layer 240 overlies the LXM layer 140. Likewise, in the second channels 116, the LXM layer 142 overlies the body 112 and is itself covered with a silver layer 242. The LXM combined with a silver overlay provides an electrode composition 238 that constitutes a substantial improvement over the prior art electrodes (such as 40, 42 and 44 in prior art FIGS. 2 and 3).

The electrode composition 238 of FIG. 7 provides for a substantial improvement in the conductivity of the electrodes over the prior art platinum electrodes 40 and 42 because silver is substantially more conductive than platinum while simultaneously being substantially cheaper than platinum. For example, the resistivity of platinum is approximately $10.5 \times 10^{-6}$ ohm-cm while that of silver is only $1.6 \times 10^{-6}$ ohm-cm, a difference of about 6.5× (see, e.g., Semiconductor Integrated Processing Technology, p. 546 (Addison-Wesley, 1990)). Although many had previously desired to use silver (and attempted such use) as an electrode material, prior art attempts failed due to electromigration of the silver. For example, an experiment was conducted in which silver (the thickness of which was not measured) was applied to both sides of a stabilized bismuth oxide wall which itself was approximately 14 mils thick. When a voltage was applied to the electrodes causing a voltage potential across the silver layer electrodes (and therefore the stabilized bismuth oxide wall), the silver quickly electromigrated into the stabilized bismuth oxide and caused a dead short between the electrodes (occurring within approximately 15–20 minutes). Such electromigration is highly undesirable since such behavior will render an oxygen generator (such as the generator 100) using such electrodes inoperable since oxygen ions will not conduct through the stabilized bismuth oxide if the silver has shorted out the first and second channels (such as the channels 114 and 116).

It has been found that applying a silver layer over a LXM electrode layer in the first and second channels 114 and 116 of the generator 100 in FIG. 4 provides a highly conductive electrode composition without the electromigration of silver into the stabilized bismuth oxide body 112. Consequently, the LXM provides a barrier against silver electromigration. An experiment was conducted in which LXM (wherein X was strontium) was painted on opposing surfaces of a stabilized bismuth oxide wall (approximately 14 mils thick). Subsequently, a silver layer was painted over the LXM layers and a voltage was applied across the multi-layer electrode composition 238. The applied voltage across the electrodes was maintained for approximately 100 hours, after which the electrodes were analyzed and no electromigration of silver was detected.

It is not known for certain why the silver does not electromigrate when applied over the LXM electrode material; however, it is hypothesized that the LXM layers consist of a host of intertwined ceramic strings which form a mesh type structure. It is further hypothesized that the deposited silver particles are simply too large to fit through the LXM mesh and therefore the LXM provides a silver electromigration barrier.

Figure 8:
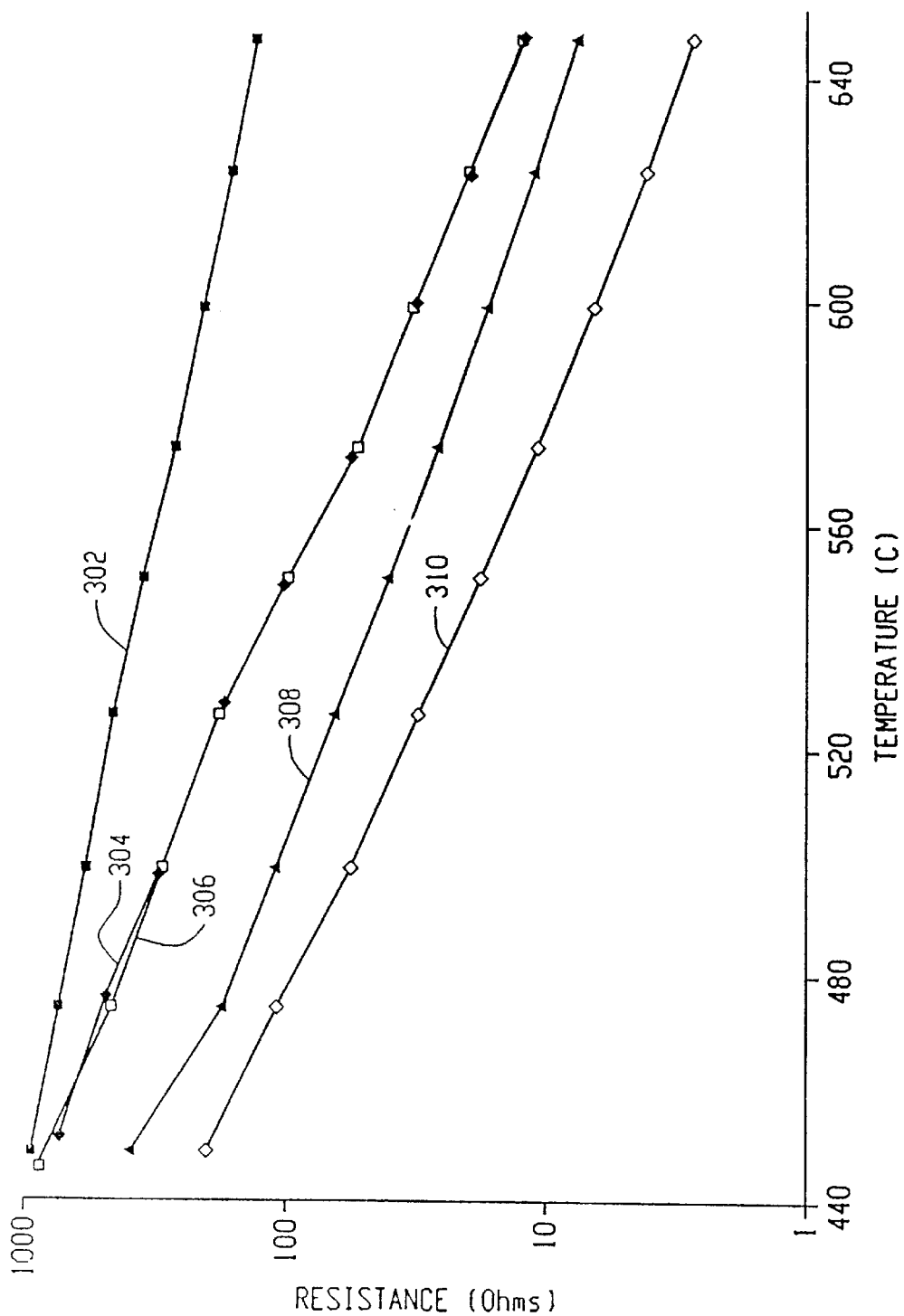
FIG. 8 is a graph illustrating the conductivity of the electrode compositions of the present invention compared to prior art electrode compositions.

The advantages of the LXM and silver electrode composition 238 over the LXM material alone (140 and 142 of FIG. 5) and the prior art platinum electrodes (40 and 42 of FIG. 2) may be more fully understood and appreciated in conjunction with FIG. 8. FIG. 8 is a graph which illustrates the resistance in ohms (the Y axis) over a range of temperature (the X axis). Note that conductivity is the inverse of resistance (as is well known by those skilled in the art) and the Y axis employs a logarithmic scale. FIG. 8 illustrates a resistivity curve 302 of an LXM electrode composition (wherein X is strontium) having a first thickness, two resistivity curves 304 and 306 of a platinum composition, a resistivity curve 308 of LXM having a first thickness with a silver overlay and another resistivity curve 310 of LXM having a second thickness with a silver overlay. Each of the resistivity curves in FIG. 8 were measured at a current density near 0 amps/cm$^2$. FIG. 8 illustrates that across an applicable temperature range, the LXM with silver electrode compositions (curves 308 and 310) exhibit approximately 2–7 times less resistance than the prior art platinum electrode composition while simultaneously being substantially less expensive to construct. The lower resistivity is a substantial advantage over the prior art since it allows for either lower power dissipation at a given current (since power $P=VI=I^2R$) or allows for operation of the oxygen generator at a lower temperature (or a combination of both).

Figure 9:
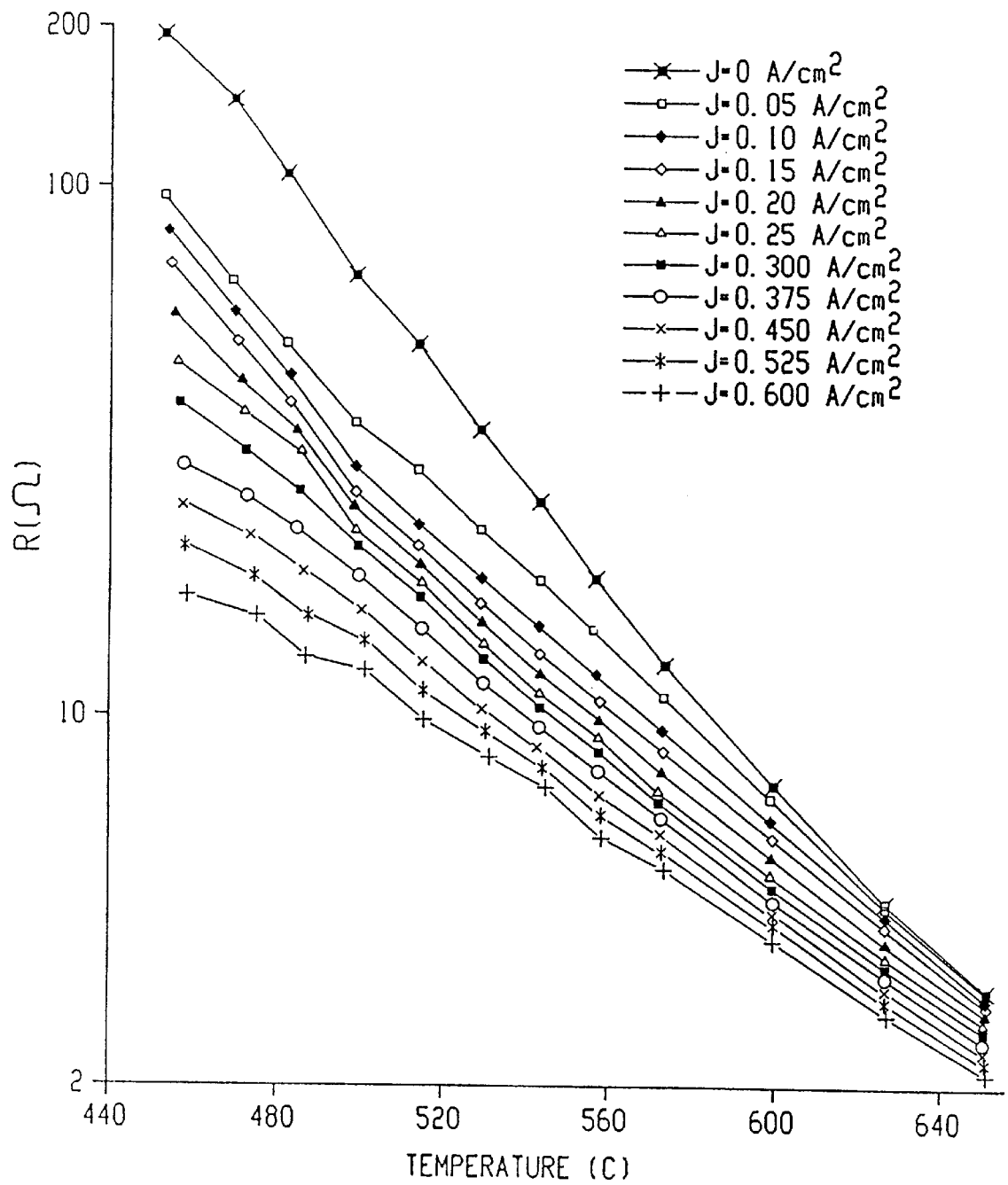
FIG. 9 is a graph illustrating the R-J-T effect of an electrode composition according to one embodiment of the present invention for varying current densities.

FIG. 9 is a graph that illustrates the so-called R-J-T effect of the LXM and silver electrode composition 238 of FIG. 7. The R-J-T effect is a self-defined term, wherein R represents resistance, J represents current density and T represents temperature. The R-J-T effect of FIG. 9 is therefore a graphical characterization of how an electrode composition's resistance changes over temperature at various current densities. FIG. 9 clearly illustrates that at a particular current density the resistivity of the electrode composition 238 decreases as the temperature increases. This type of R-J-T effect is not unique to the electrode composition 238, since a similar behavior may be seen with platinum electrodes. Nevertheless, since the composition 238 is much less resistive than platinum (see FIG. 8) the R-J-T effect of the composition 238 further improves the generator 100 (decreases electrode resistance) of FIG. 4 over those of the prior art by increasing the current density.

FIG. 9 shows that as the current density is increased (for example, from near 0 A/cm$^2$ to 0.60 A/cm$^2$) the resistivity of the composition 238 is further reduced up to 10× (see, e.g., the resistivity at approximately 460° C.). The R-J-T effect of the composition 238 therefore further allows for the resistivity to be decreased, thereby further reducing the power dissipation of the generator 100 employing the electrode composition 238.

The R-J-T effect is beneficial for the following reason. In the oxygen generator 100 of FIG. 4, when one wishes to increase the rate of oxygen generation, the voltage is increased (via the voltage source 122), thereby increasing the current flowing through the body 112 between the channels 114 and 116. It follows therefore from FIG. 9 that at a given temperature, as the current is increased to generate more oxygen 134, the resistivity of the electrode composition 238 decreases, thereby holding the power dissipation of the generator 100 relatively constant. Consequently, generating a lot of oxygen 134 may not require substantially more power than the generation of only a little oxygen 134. Obviously, this is highly advantageous in commercial applications when the generator 100 is portable and powered by a battery.

Figure 10:
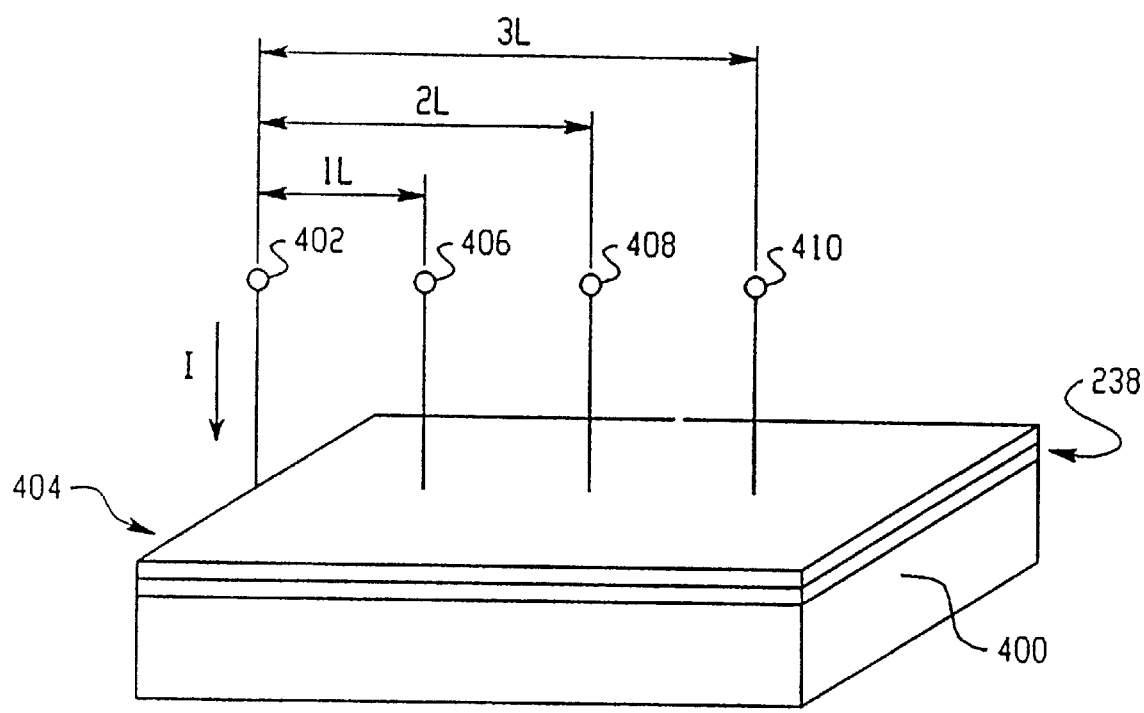
FIG. 10 is a perspective view of a stabilized bismuth oxide sidewall having a multi-layer electrode composition according to the present invention deposited thereon.
Figure 11:
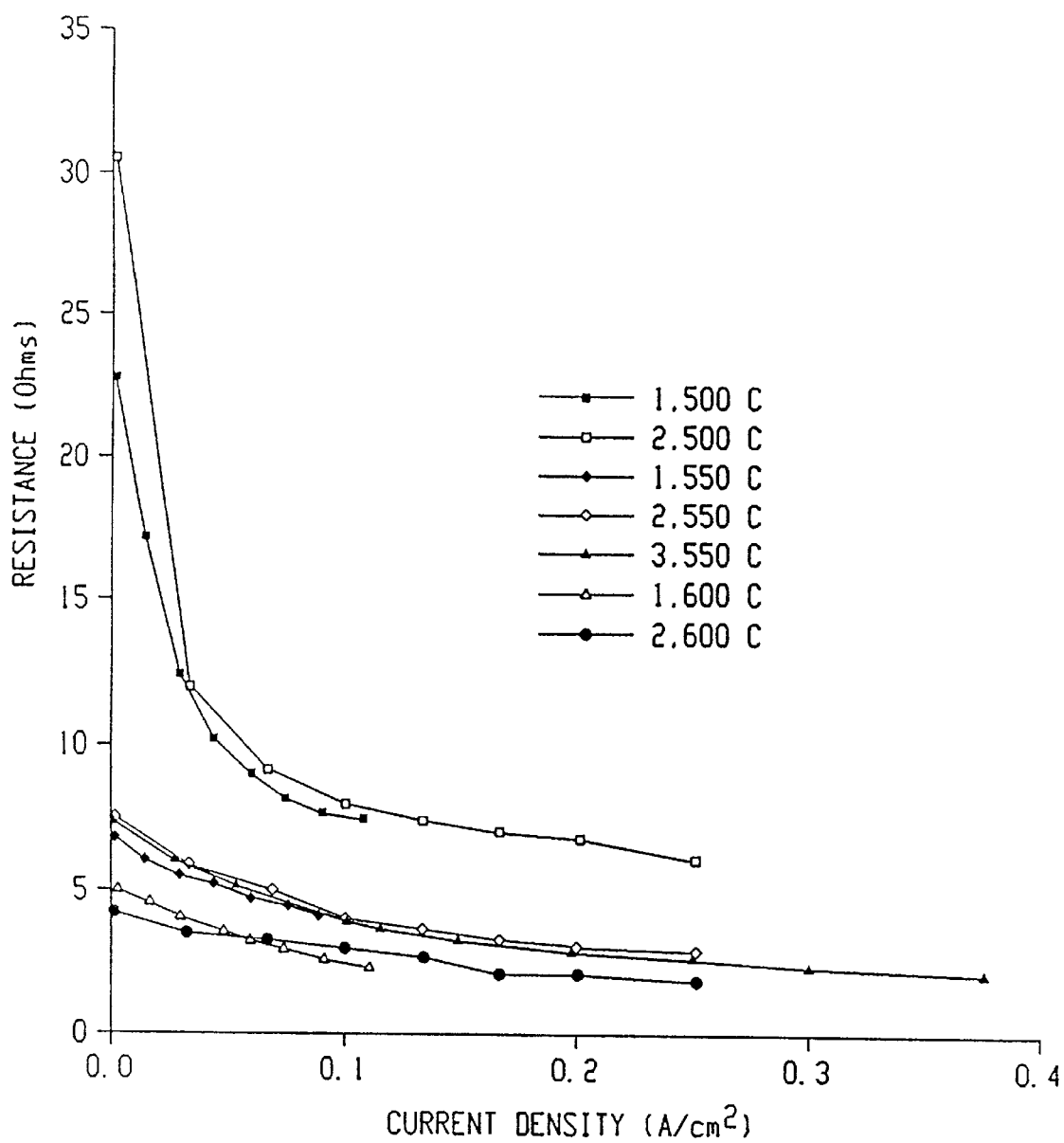
FIG. 11 is a graph illustrating the resistivity of the multi-layer electrode composition of FIG. 10 over current density for various channel lengths.

The benefits of the substantial reduction in resistivity of the electrode composition 238 over that of the prior art may be further appreciated in conjunction with FIGS. 10 and 11. In FIG. 10, an experiment is illustrated, wherein a stabilized bismuth oxide sidewall 400 is covered on one side with the LXM and silver electrode composition 238 along the length of the sidewall 400. A terminal 402 is coupled to the composition 238 at an end 404 of the sidewall 400 and a plurality of terminals 406, 408 and 410 are coupled to the composition 238 at various locations that correspond to multiples of the channel length of the prior art generator 10 of FIG. 1, wherein a single channel length (1L) is approximately 1 inch. Therefore the first terminal 406 is one channel length (1L) form the end terminal 402, the second terminal 408 is two channel lengths (2L) from the end terminal 402 and the third terminal 410 is three channel lengths (3L) form the end terminal 402, respectively.

In the experiment, a current (I) was input at the end terminal 402 and the resistivity of the composition 238 and the sidewall 400 at each terminal 406, 408 and 410 was measured. Furthermore, the current (I) was varied (and therefore the current density) in addition to the temperature and the resistivity results were recorded in FIG. 11. FIG. 11 illustrates that the resistivity of the LXM and silver electrode composition 238 is so small that the change in resistivity due to changes in channel length (1L, 2L or 3L) is, for practical purposes, negligible.

This resistivity characteristic of the electrode composition 238 is highly advantageous because it allows the channel length of the oxygen generator 100 of FIG. 4 to be substantially decreased over the channel length of prior art generators such as the oxygen generator 10. In prior art generators, the length of the channels can not extend substantially beyond ¾1 inch because the resistivity of the platinum electrodes would increase to an extent that current crowding would occur, resulting in regions of the channels beyond approximately 1 inch being substantially ineffective. The resistivity increase due to the longer length, as discussed earlier, also undesirably increases the prior art generator's power dissipation. The prior art channel length limitations are also undesirable because for a substantial oxygen generating capacity, a large number of channels must be constructed in the body 12 since each channel has a relatively small volume. As is well known by those skilled in the art, extruding a honeycomb body such as the body 12 of prior art FIG. 1, is difficult, unreliable and expensive since the footprint of the faces 18 and 20 is large with many holes and the width of the side face 36 is small (approximately 1 inch).

The electrode composition 238 of the present invention, on the other hand, may be constructed with channels 114 and 116 that are substantially longer than those of the prior art without the current crowding or power dissipation problems of the prior art. Furthermore, since the channels 114 and 116 can be made substantially longer than 1 inch, the footprint of the faces 118 and 120 can be made much smaller, thereby reducing the size of the generator 100, without impacting the oxygen generating capacity of the generator 100. The increased flexibility in manufacturing allows the extrusion of the body 112 to be more reliable and easier and consequently less expensive, thereby further reducing the cost of the generator 100 over the prior art. Lastly, since each channel may be longer than the prior art channels and therefore provide more electrode surface area per channel, and since the resistance of each channel is inversely proportional to its surface area for a given film thickness (as is well known by those skilled in the art), the resistance of each channel is further reduced over the prior art.

Figure 6:
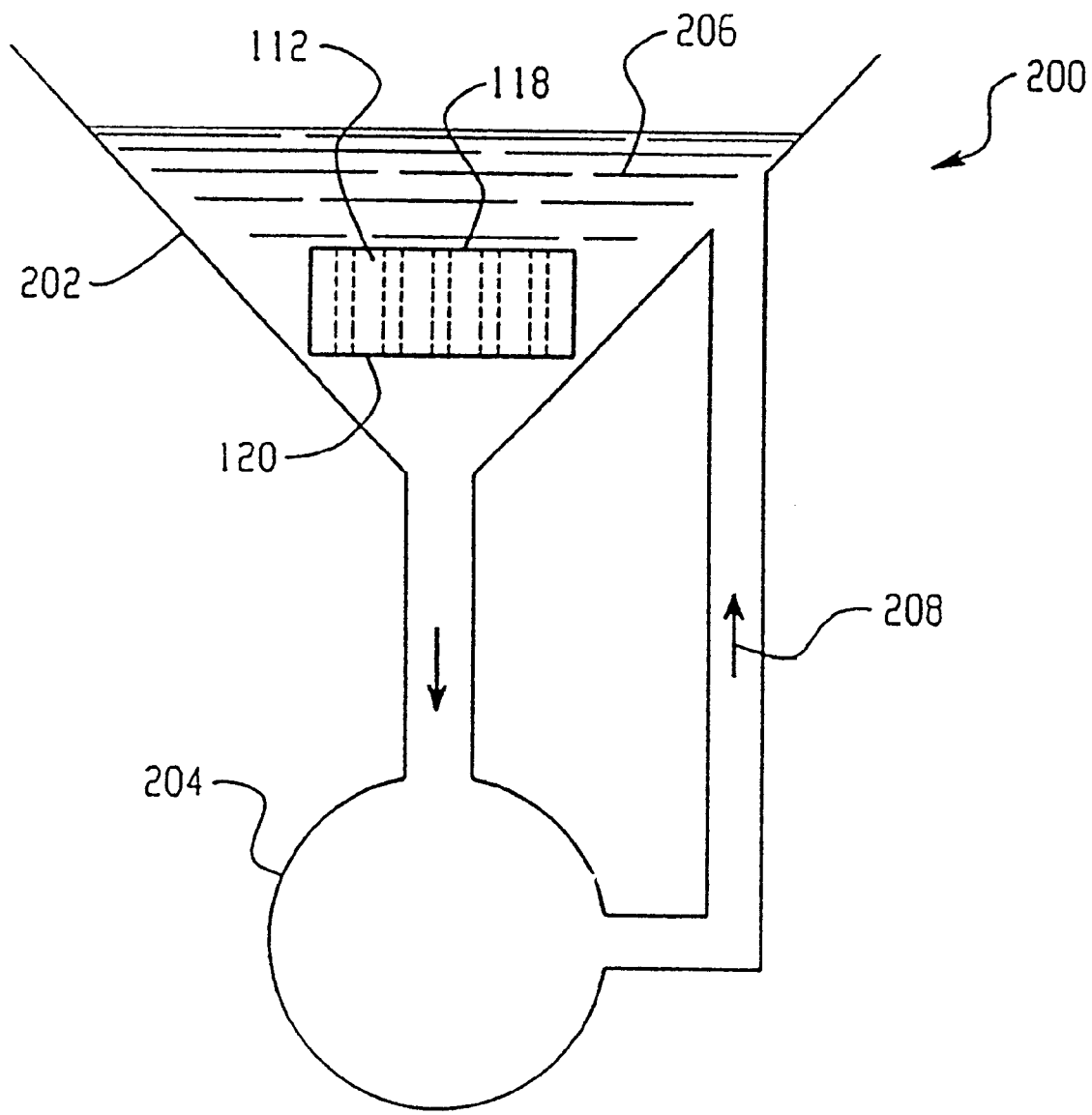
FIG. 6 is system level diagram illustrating an apparatus for forming electrodes within the channels of the oxygen generator of FIG. 4.

The silver may be applied to the LXM material to form the electrode composition 238 in much the same way as the LXM was applied to the stabilized bismuth oxide body 112 as discussed in conjunction with FIG. 6. Namely, a silver powder is combined with terpineol (or any organic liquid) to create slurry which may be placed into the reservoir 202. The body 112 (now already having its channels 114 and 116 coated with LXM) is placed in the slurry and the pump 204 is activated thereby forcing the silver slurry through the channels 114 and 116. Subsequently, the body 112 is fired, thereby setting the silver layer and forming the silver and LXM electrode composition 238 within the channels 114 and 116.

In a preferred embodiment, a silver paste (ESL 9901, wherein ESL stands for Electro Science Laboratories) is diluted with a thinner (such as, for example, ESL 401 thinner) in a range of about 0.05 ml of thinner per gram of ESL 9901 paste to about 0.193 ml of thinner per gram of ESL 9901 paste. Alternatively, a suitable mixture by volume is about 0.656 ml of thinner per cubic centimeter of ESL 9901 paste (or, alternatively, 1.524 cm$^3$ of ESL 9901 paste per ml of thinner). The dilution of the silver paste is preferred because it provides improved porosity of the resultant silver film which prevents bubbling of the film during oxygen ion conduction.

Alternatively, other methods of improving the porosity of the silver film are also contemplated as falling within the scope of the present invention. For example, additives may be applied to the silver paste to inhibit sintering of the silver (such as, for example, MgO or $Al_2O_3$). Further, an additive may be applied to create porosity by burning out during sintering.

In yet another alternative embodiment, a silver palladium (Ag/Pd) paste may be used (such as, for example, ESL 9645 Ag/Pd paste) which provides sufficient porosity without requiring any dilution.

In yet another embodiment of the present invention, the silver layer that is formed on the LXM material to form the electrode composition 238 may be combined with glass to improve the silver's adherence to the LXM, thereby further improving the electrode composition. For example, in an experiment, a silver powder and a glass powder were combined together wherein the glass powder comprised about 20–35% by volume of the mixed silver and glass powder. The silver and glass mixture was then formed in a slurry with, for example, terpineol, applied to the LXM material and then fired. After the silver and glass mixture was set, it was found that the adherence was greatly improved. Adding a glass mixture to either the LXM or silver layers, however, involves a performance trade-off because although the added glass provides improved adherence, it has been found that the added glass also provides erratic and noisy electrical behavior for the electrode composition.

Although the invention has been shown and described with respect to a certain preferred embodiment or embodiments, it is obvious that equivalent alternations and modifications will occur to others skilled in the art upon the reading and understanding of this specification and the annexed drawings. In particular regard to the various functions performed by the above described components (assemblies, devices, compositions, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments, as may be desired and advantageous for any given or particular application.

What is claimed is:

1. An oxygen generator, comprising:

a bismuth oxide body;

a plurality of first and second channels defined by channel walls, extending from inlet openings to outlet openings in the body, wherein the first channels receive a first gas containing some oxygen and the second channels are sealed at the inlet and outlet openings and extend generally in parallel to the first channels;

electrodes disposed on the channel walls of the first and second channels, wherein the electrodes comprise LXM, wherein L is lanthanum, M is manganate, and X is strontium, calcium, lead or barium, and wherein the electrodes further comprise glass mixed with silver disposed over the LXM, thereby decreasing the resistivity of the electrodes and providing improved adherence of the silver to the LXM;

means for interconnecting the electrodes in the first channels;

means for interconnecting the electrodes in the second channels; and a voltage source electrically connected to the electrodes.

2. The oxygen generator of claim 1, wherein the mixture of silver to glass is 2:1 by volume.

3. An oxygen generator, comprising:

a bismuth oxide body;

a plurality of first and second channels defined by channel walls, extending from inlet openings to outlet openings in the body, wherein the first channels receive a first gas containing some oxygen and the second channels are sealed at the inlet and outlet openings and extend generally in parallel to the first channels;

electrodes disposed on the channel walls of the first and second channels, wherein the electrodes comprise LXM, wherein L is lanthanum, M is manganate, and X is strontium, calcium, lead or barium, wherein the LXM has a grain size of less than about 5 microns;

means for interconnecting the electrodes in the first channels;

means for interconnecting the electrodes in the second channels; and a voltage source electrically connected to the electrodes.

4. The oxygen generator of claim 3, wherein the LXM has a grain size of less than about 1 micron.

5. An oxygen generator, comprising:

a bismuth oxide body;

a plurality of first and second channels defined by channel walls, extending from inlet openings to outlet openings in the body, wherein the first channels receive a first gas containing some oxygen and the second channels are sealed at the inlet and outlet openings with an electrically insulating material that has approximately the same coefficient of expansion as the body, and wherein the second channels extend generally in parallel to the first channels;

electrodes disposed on the channel walls of the first and second channels, wherein the electrodes comprise LXM, wherein L is lanthanum, M is manganate, and X is strontium, calcium, lead or barium;

means for interconnecting the electrodes in the first channels;

means for interconnecting the electrodes in the second channels; and a voltage source electrically connected to the electrodes.

6. An oxygen generator, comprising:

a bismuth oxide body;

a plurality of first and second channels defined by channel walls, extending from inlet openings to outlet openings in the body, wherein the first channels receive a first gas containing some oxygen and the second channels are sealed at the inlet and outlet openings and extend generally in parallel to the first channels;

electrodes disposed on the channel walls of the first and second channels, wherein the electrodes comprise LXM, and wherein the LXM is $La_{0.6}Pb_{0.4}MnO_3$;

means for interconnecting the electrodes in the first channels;

means for interconnecting the electrodes in the second channels; and a voltage source electrically connected to the electrodes.

7. An oxygen generator, comprising:

a bismuth oxide body having channels extending therethrough; and electrodes in the channels, wherein the composition of the electrodes comprise:

lanthanum;

manganate; and an element, wherein the element is strontium, calcium, lead or barium, and wherein the element is X and the mixture of lanthanum and X is characterized by $La_{(1-Y)}X_Y$, wherein $0.1 < Y < 0.5$.

8. An oxygen generator, comprising:

a bismuth oxide body having channels extending therethrough; and electrodes in the channels, wherein the composition of the electrodes comprise:

lanthanum;

manganate; and an element, wherein the element is strontium, calcium, lead or barium, and wherein the ratio of lanthanum to the element is about 4:1.

9. An oxygen generator, comprising:

a bismuth oxide body having channels extending therethrough; and electrodes in the channels, wherein the composition of the electrodes comprise:

lanthanum;

manganate; and an element, wherein the element is strontium, calcium, lead or barium, and further comprising silver disposed over the electrodes, thereby reducing the resistivity of the electrodes.

10. The composition of claim 9, further comprising glass mixed with the silver, thereby improving the adherence of silver to the electrodes.

11. The composition of claim 10, wherein the ratio of silver to glass is 2:1 by volume.

12. An oxygen generator, comprising:

a bismuth oxide body having channels extending therethrough; and electrodes in the channels, wherein the electrode composition is $La_{0.6}Pb_{0.4}MnO_3$.

* * * * *